Figure 1:
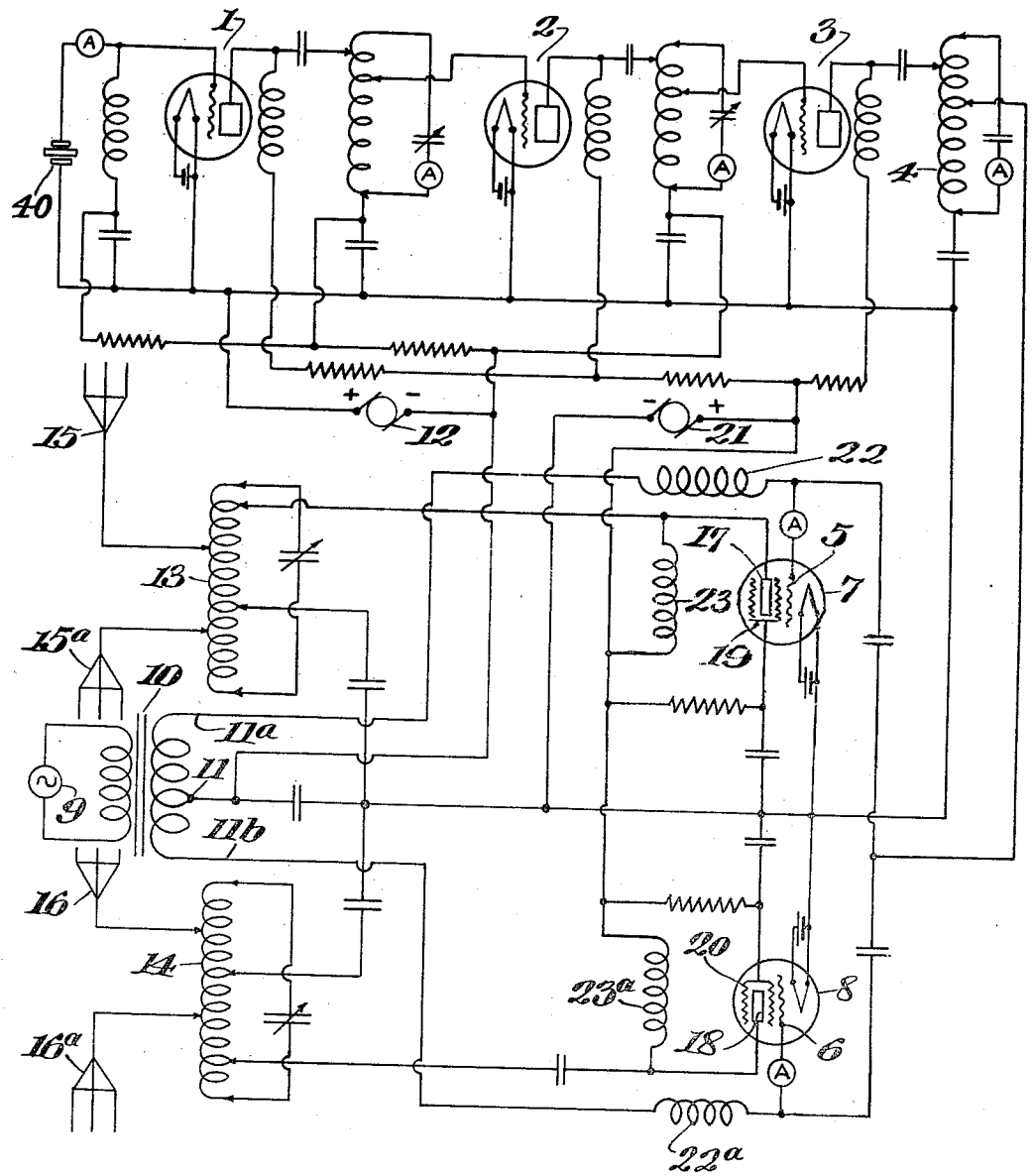

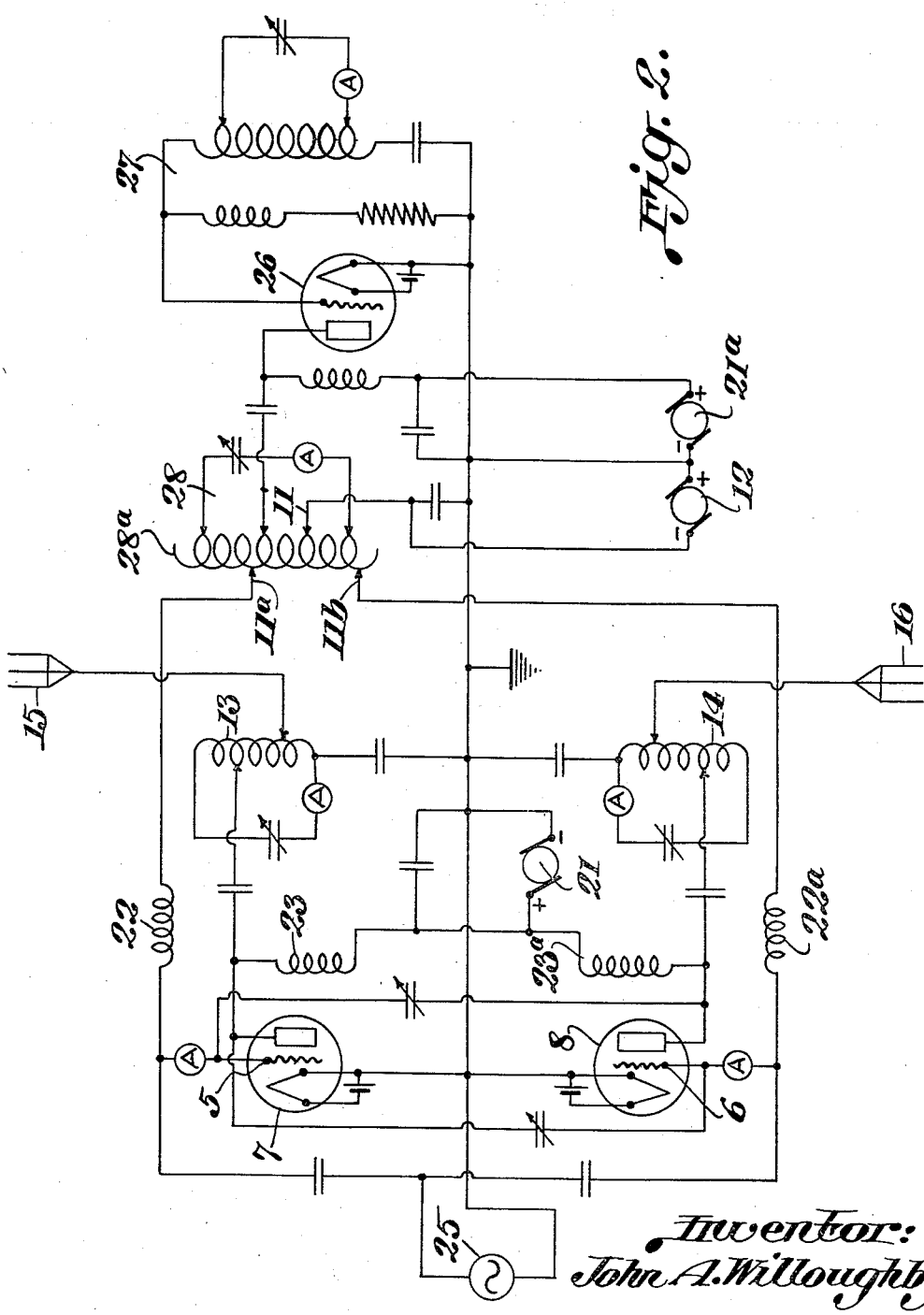

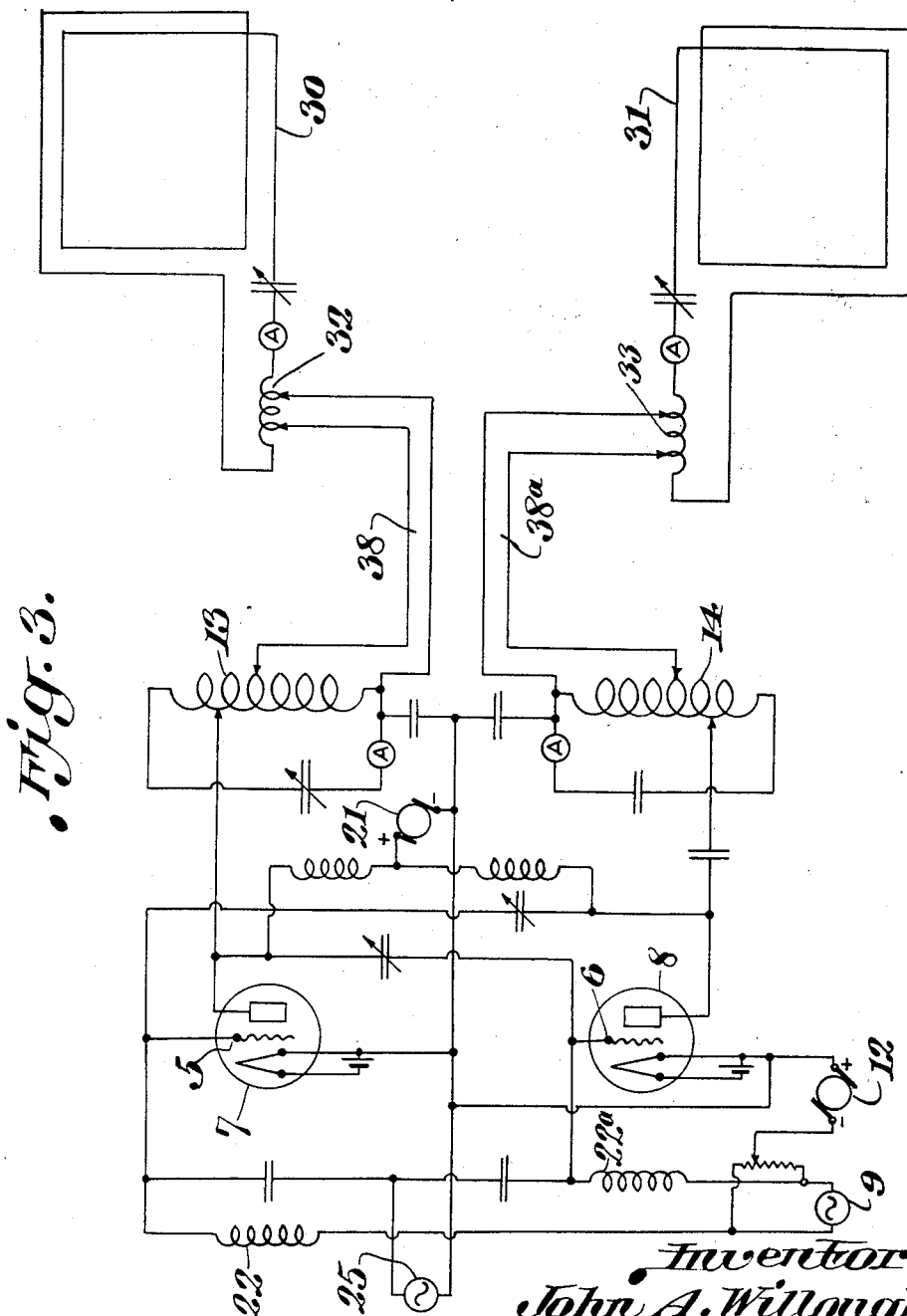

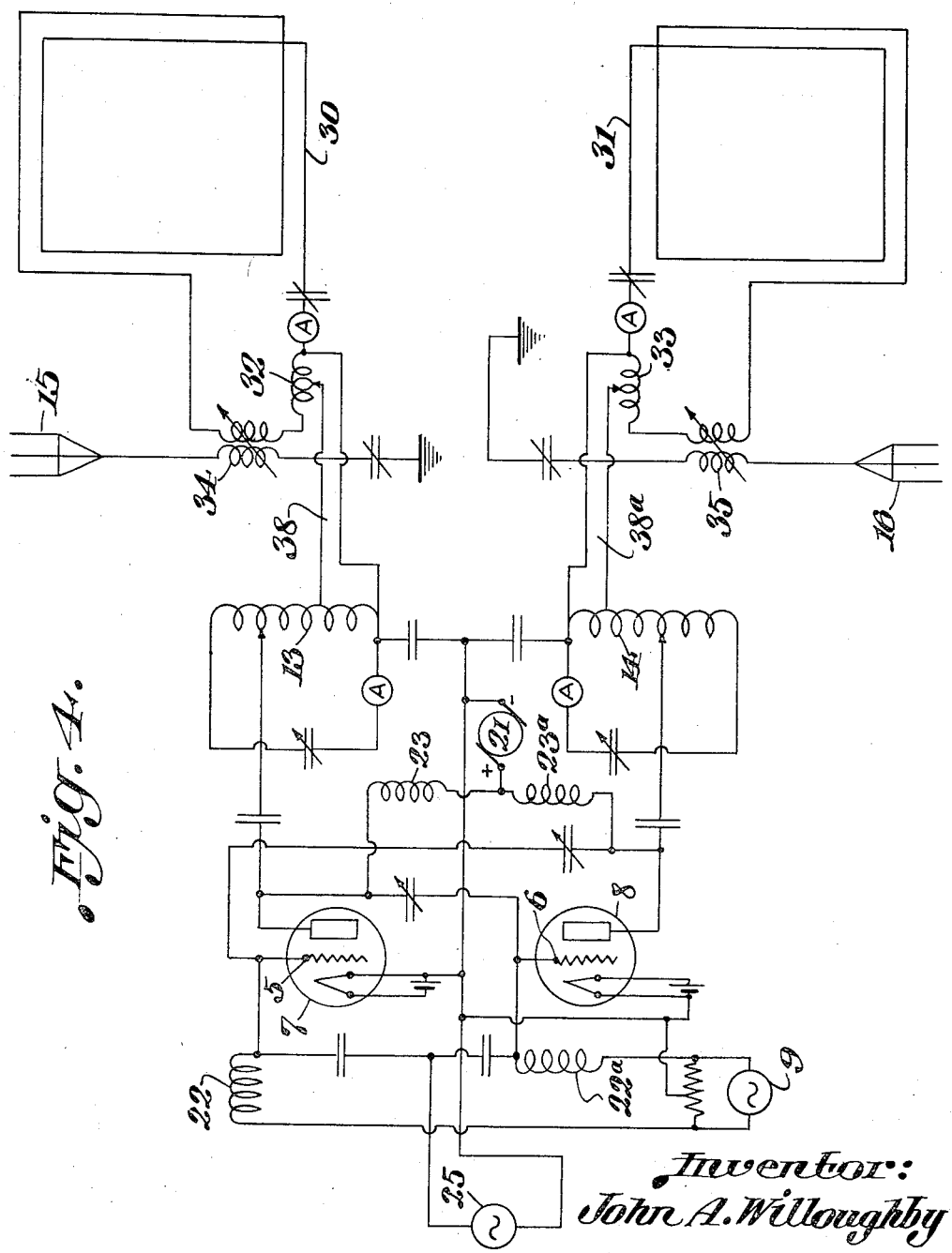

Patented Oct. 17, 1933

1,930,868

UNITED STATES PATENT OFFICE 1,930,868

TRANSMITTING SYSTEM

John A. Willoughby, Cambridge, Mass.

Application December 22, 1928
Serial No. 327,975

12 Claims. (Cl. 250—17)

My invention relates to transmitting systems in general and more specifically to transmitting systems for the transmission of continuous wave energy.

An object of my invention is to provide a transmitting system whereby the energy received from such a system is not affected by fading.

Another object of my invention is to provide a thermionic tube transmitter whereby the energy is radiated alternately from two independent radiating systems.

Still another object of my invention is to provide a thermionic tube transmitter whereby the energy is simultaneously radiated from two individual radiating systems followed by radiation from the one, radiation from the two and followed by the radiation from the other in a predetermined successive order.

A further object of my invention is to provide a transmitting system employing thermionc tubes whereby the propagated waves travel in different paths to the receiving antenna and at different phase angles.

Other and further objects of my invention reside in the circuit arrangements employed in the transmitting system of my invention, a better understanding of which can be had from the specification following and from the accompanying drawings wherein, Figures 1, 2, 3 and 4 show modifications of the transmitting systems of my invention.

The phenomena of fading of the received energy has been attributed to terrestrial magnetism and to many other causes. Fading of the received energy is commonly experienced and is believed to be related to atmospheric and barometric conditions as it is more or less pronounced during certain periods. The facts seem to indicate that the propagated waves are neutralized by other sources of energy or the conditions of the atmosphere for the conduction of the wave energy are changed. Fading is experienced from stations transmitting from a given locality while energy from other stations having substantially the same location is unaffected. Fading of the received signaling energy seems to likewise affect both horizontally and vertically polarized waves. In the transmitting system of my invention fading of the received signaling energy is greatly reduced.

Fig. 1 of the accompanying drawings shows one form of the transmitting system of my invention. Like reference characters are employed in all the drawings. A thermionic tube 1 is employed in an oscillatory circuit arrangement, the input circuit comprising a piezo electric element 40 and the output circuit an inductance having frequency characteristics corresponding approximately to the frequency characteristics of the piezo electric element or a frequency multiple thereof. The energy from the output circuit of thermionic tube 1 is associated with the input circuit of thermionic tube 2. Thermionic tube 2 amplifies the energy from the output circuit of thermionic tube 1. The amplified energy is transferred from the output circuit of thermionic tube 2 to the input circuit of thermionic tube 3. Thermionic tube 3 further amplifies the energy received from thermionic tube 2. Thermionic tubes 1, 2 and 3 are herein illustrated as of the three electrode type however tubes having four or more electrodes may be employed. The anode circuits of thermionic tubes 1, 2 and 3 are energized from source 21 through suitable resistance units for reducing the applied potential. The control electrodes of thermionic tubes 1, 2 and 3 are supplied with a source of biasing potential from source 12. The cathode circuits are energized by individual batteries however it is obvious that the source of energy may be alternating current, a motor generator or other suitable means. The output circuit of thermionic tube 3 includes inductance 4. The high frequency signaling energy is transferred from inductance 4 to the control electrodes 5 and 6 of thermionic tubes 7 and 8. Thermionic tubes 7 and 8 are shown having a common cathode connection with thermionic tubes 1, 2 and 3. Thermionic tubes 7 and 8 are illustrated as of the four electrode type, however it is obvious that any tube may be employed having more than three electrodes. The cathodes of thermionic tubes 7 and 8 are shown energized by individual batteries and it is likewise obvious that a common source of any suitable potential may be employed in their stead. The anodes 17 and 18 and shielding anode electrodes 19 and 20 of thermionic tubes 7 and 8 respectively are energized from source 21 by way of choke coils 23 and 23a. Thermionic tubes 7 and 8 are connected in a balanced amplifier circuit arrangement the amplified energy from which is associated with output circuits 13 and 14 respectively. Output circuits 13 and 14 are associated with space radiating systems 15, 15a and 16, 16a respectively. A source of direct current control electrode biasing potential is supplied control electrodes 5 and 6 from source 12 through an intermediate tap of transformer secondary winding 11, through the respective sections of this winding on each side of this intermediate point and through conductors 11a and 11b and high frequency choke coils 22 and 22a, respectively. One connection from source 12 leads to the common cathode circuit. A source of alternating potential 9 is electrically associated with the primary winding of transformer 10.

The operation of the transmitting system of my invention schematically illustrated in Fig. 1 is as follows: The amplified high frequency energy from the output circuit 4 of thermionic tube 3 is transferred to control electrodes 5 and 6 of thermionic tubes 7 and 8 respectively. A supply of biasing potential from source 12 is of the proper value to cause both tubes 7 and 8 to amplify the energy from output circuit 4 and transfer the same to output circuits 13, 14 and to radiating systems 15, 15a and 16, 16a. Source of alternating potential 9 is associated with transformer 10 which latter is connected in the control electrode circuits of thermionic tubes 7 and 8 through connections as shown. The secondary connections 11a and 11b pass through alternate polarity in respect to the intermediate connection 11 of the transformer secondary winding. The cathode connection of tubes 7 and 8 is connected to the positive terminal of biasing source 12, as shown. The negative terminal of source 12 is connected to the intermediate tap of winding 11. In circuit 12—11—11a—5—7—12 there is applied, due to source 12, a voltage which is always of the same sense and value. In circuit 12—11—11b—6—8—12, due to source 12 there is applied a voltage which is always of the same sense and value. There is also applied in both circuits, through winding sections 11a—11 and 11—11b the alternating voltage of source 9 and the instantaneous values of this voltage at a given instant are applied in the same sense in both of these winding sections. At any instant the effective voltage acting in circuit 12—11—11a—5—7—12 is the resultant of the voltage applied in this circuit by source 12 and the voltage applied in this circuit by source 9, and correspondingly for circuit 12—11—11b—6—8—12.

Assume an instant when source 9 applies to the windings of 11, a potential which in itself would make terminal 11a positive with respect to the intermediate tap, and which in itself would make the intermediate tap positive with respect to terminal 11b. Then in circuit 12—11—11a—5—7—12, source 9 applies a voltage which opposes the voltage applied by source 12 and the resultant instantaneous voltage in this circuit is the difference of the two applied voltages and less than if source 9 were removed. At the same instant, in circuit 12—11—11b—6—8—12 source 9 applies a voltage which assists the voltage applied by source 12, and the resultant instantaneous voltage in this latter circuit has a value which is the sum of the two applied voltages and greater in value than if source 9 were removed. That is, when the potential across winding 11, 11a due to source 9, is adding to the potential from source 12, the potential across winding 11, 11b due to source 9, is subtracting from the potential from source 12. This causes an increase in the control electrode biasing potential supplied control electrode 5 and a reduction in the value of potential supplied control electrode 6. The characteristics of thermionic tubes 7 and 8 may be such that the normal potential supplied by other sources such as 12, to the control electrodes, neglecting source 9 is of the proper value to cause these tubes to function as amplifiers. An increase in value of negative potential may cause a blocking of the tube or cause the tube to fail to amplify. For the purpose of explanation suppose that tubes of the above mentioned characteristics correspond to thermionic tubes 7 and 8. Let us further assume an instant when the polarity of connection 11a due to source 9, is positive in respect to nodal point or intermediate tap 11, and the polarity of 11b due to source 9 is negative with respect to tap 11. This potential, due to source 9, would subtract from the negative potential due to source 12 and allow thermionic tube 7 to amplify the energy and transfer the same to output circuit 13 and to radiating system 15, 15a. The polarity of connector 11a being positive in respect to node 11, the polarity of connection 11b would be negative in respect to node 11. The potential 11—11b, due to source 9, would add to the potential from source 12 and reduce the amplification or totally block the operation of thermionic tube 8. No energy would be transferred to output circuit 14 or to radiating circuit 16, 16a. At the end of the next quarter cycle the potential supplied control electrode 5 would reduce to that from source 12 and the negative potential supplied would be sufficient to cause thermionic tube 7 to amplify the energy from output circuit 4 but the amplification would not be as great as during the previous quarter cycle when the potential from source 12 was in part neutralized by the opposite polarity of the potential from source 9. Control electrode 6 of thermionic tube 8 would likewise be supplied with a corresponding potential and would amplify the energy from output circuit 4. Both thermionic tubes 7 and 8 are now amplifying the energy from source 4 where, during the preceding quarter cycle, thermionic tube 7 was functioning as an amplifier and thermionic tube 8 was inoperative because of the high negative potential impressed upon control electrode 6. At the end of the following quarter cycle, due to source 9, connector 11a would have a negative potential in respect to nodal connection 11. The polarity in this instance would cause the potential from source 9 to add to the potential from source 12 and a high negative potential would be impressed upon control electrode 5 of thermionic tube 7. This potential would block the operation or reduce the amplification of thermionic tube 7. Since connector 11a is negative in respect to connector 11, connector 11b would be positive in respect to connector 11. Keeping in mind that connector 11 is common with the cathode circuits of both thermionic tubes 7 and 8, the polarity of the potential from source 9 would, during this quarter cycle neutralize or reduce the negative potential impressed upon control electrode 6 of thermionic tube 8. Therefore thermionic tube 8 would amplify the energy from output circuit 4 and transfer the same to output circuit 14 and radiating system 16, 16a. At the end of the next quarter cycle the potential from source 9 is zero and the potential impressed upon control electrodes 5 and 6 of thermionic tubes 7 and 8 respectively, is substantially that from source 12. Both thermionic tubes 7 and 8 now operate as amplifiers and circuits 13, 14, 15, 15a, 16 and 16a are energized. At the end of the next quarter cycle the polarity of connector 11a is positive in respect to the polarity of nodal connection 11 and thermionic tube 7 operates as an amplifier while at the same time the operation of thermionic tube 8 is prevented because of the high negative potential impressed upon its control electrode 6. It is obvious that the conditions described for the final instants of each quarter cycle will obtain to some extent throughout that quarter cycle. Choke coils 22 and 22a have the proper frequency characteristics to offer a substantially low impedance to the potential from sources 9 and 12 but to offer a high impedance to the high frequency energy from output circuit 4. Radiating systems 15, 15a and 16, 16a may be placed in different planes whereby the propagated waves are horizontally or vertically polarized in respect to the earth's surface.

The mode of operation which has been described assumes a magnitude of constant grid biasing potential from direct current source 12 which is approximately the normal operating grid biasing potential for maximum efficiency and which is appreciably less than the direct current potential which alone would block both tubes. The system can be operated in another manner by applying a negative continuous potential from direct current source 12 which alone is of magnitude somewhat greater than that required to block tubes 7 and 8. Under these conditions, with no other applied electromotive force as from source 9, neither tube 7 nor 8 will deliver energy. If now an alternating potential from source 9 is applied, of peak value sufficient to decrease at the instants of peak the continuous negative bias to a value below the blocking point, one of the tubes 7 or 8 will deliver energy while this alternating current positive peak value exists. One tube alone will deliver energy, then the other tube alone will deliver energy, then the first tube alone will deliver energy, etc. Unless the values of direct current and alternating current potentials are very closely adjusted there will be intervening periods when neither tube delivers energy. In any case, there will be no instant with this arrangement in which both tubes are simultaneously delivering energy, in which respect the operation is different from that previously described.

Fig. 2 of the accompanying drawings shows another form of the transmitting system of my invention. Source of energy 25 corresponds to thermionic tubes 1, 2 and 3 and the energy from output circuit 4, schematically illustrated in Fig. 1 of the accompanying drawings. Source of high frequency energy 25 is caused to energize control electrodes 5 and 6 of thermionic tubes 7 and 8 respectively. The anode circuits are energized by source 21 which may consist of batteries, a motor-generator as shown, or any suitable means. The output circuits of thermionic tubes 7 and 8 include inductances 13 and 14 and radiating systems 15 and 16 respectively. Radiating systems 15 and 16 may comprise the commonly known doublets or other suitable arrangements and may be positioned in horizontal and vertical planes whereby the propagated waves are horizontally and vertically polarized in respect to the earth's surface. Thermionic tube 26 comprises a suitable oscillatory circuit arrangement including input circuit 27 and output circuit 28. The electrical center of inductance 28a may be connected to ground potential if necessary to establish the required node. This is accomplished in the accompanying circuit arrangement by connecting contact member 11 to ground potential by means of a suitable capacity. The capacity path is suitable for alternating current while the direct or continuous current path includes source of potential 12. Source of potential 12 supplies biasing potential to control electrodes 5 and 6 of thermionic tubes 7 and 8, respectively. Choke coils 22 and 22a are connected in series with this source of potential and offer a low resistance to the passage thereof while offering a substantially high resistance to the high frequency energy from source 25. Source of potential 21a supplies the necessary energy to the anode circuit of thermionic tube 26. The energy from output circuit 28 is transferred to control electrodes 5 and 6 of thermionic tubes 7 and 8 by means of connectors 11a and 11b. Connectors 11a and 11b correspond to connectors 11a and 11b of Fig. 1 and have a potential difference in respect to contact member 11. Connectors 11a and 11b alternate through different polarities in respect to the polarity of contact member 11. The impressed potential blocks the operation of thermionic tube 7 while allowing thermionic tube 8 to amplify, followed by the unblocking of thermionic tube 7 and a reduction in the amplification of thermionic tube 8, followed by the blocking of tube 8 and the unblocking of tube 7. The cycle of operation is substantially the same as that of the circuit arrangement shown in Fig. 1 of the accompanying drawings.

Figs. 3 and 4 show two other forms of the transmitting system of my invention. Fig. 3 is a schematic circuit arrangement showing source of high frequency energy 25 associated with control electrodes 5 and 6 of thermionic tubes 7 and 8 respectively. The anode circuits of thermionic tubes 7 and 8 are energized from source 21. Output circuits 13 and 14 associated with thermionic tubes 7 and 8 respectively are associated with transmission lines 38, 38a. Transmission lines 38, 38a are also associated with radiating circuits 32, 20 and 33, 31, respectively. Radiating circuits 32, 30 and 33, 31 comprise coil antennas and suitable coupling inductances. Coil antennas 30 and 31 may be placed at right angles to each other. It is well known that a coil antenna when excited, radiates energy in a figure 8 characteristic. However, when two coil antennas placed at right angles to each other are excited alternately very rapidly, such as the superimposing of commutating voltages upon the control electrodes of an oscillator or amplifier tube, the above mentioned figure 8 characteristic will now produce a radiated field of energy of two figure 8's at right angles each to the other resulting in a non-directional wave. In Fig. 3 the source of commutating voltages comprises generator 9 which is shunted by a suitable resistance. The electrical center or a point near the electrical center of the resistance is connected to the common cathode connection of thermionic tubes 7 and 8. The commutating voltages are impressed upon control electrodes 5 and 6 of thermionic tubes 7 and 8 by way of choke coils 22 and 22a respectively. Choke coils 22 and 22a have the proper frequency characteristics to offer a low impedance to the commutating voltages from source 9 and at the same time offer a high impedance to the passage of high frequency energy from source 25. By employing a circuit arrangement of this type it is possible to transmit energy from one coil antenna, followed by transmission from the first coil antenna and a second coil antenna, followed by transmission from the second, again transmitted from the two and continuing in this manner in a repeating successive order.

Fig. 4 of the accompanying drawings shows a modification of the circuit arrangement schematically illustrated in Fig. 3. In this circuit arrangement the reference characters correspond to those employed in the foregoing illustrations. Coil antennas 30 and 31 are associated with output circuits 13 and 14 of thermionic tubes 7 and 8 by means of transmission lines 38 and 38a respectively. Control electrodes 5 and 6 of thermionic tubes 7 and 8 respectively are supplied with commutating voltages from source 9. Coil antennas 30 and 31 are associated with inductances 32, 34 and 33, 35 respectively. Inductances 34 and 35 are associated with radiating systems 15 and 16 respectively. Coil antennas 30 and 31 may be placed in any desired position including the ninety degree relation for producing the composite figure 8 effect. The transmission from coil antennas 30 and 31 would be substantially as from coil antennas 30 and 31 of Fig. 3 if they were placed in such positions. Radiating systems 15 and 16 may comprise suitable doublet antenna systems or may be horizontally and vertically positioned for causing the transmission of horizontally and vertically polarized waves. The two figure 8 radiation characteristics of coil antennas 30 and 31 would therefore cause a non-directional wave to be propagated while antennas 15 and 16 would cause the propagation of vertically and horizontally polarized waves. The reception of signaling energy from the aforementioned arrangement is substantially free from fading effect. Antennas 15 and 16 may be positioned at any desired portion of transmission lines 38 and 38a respectively and comprise any suitable type of space radio radiating system.

In the foregoing specification and in the accompanying drawings I have referred to and illustrated certain types of thermionic tubes. It is obvious that thermionic tubes having four or more electrodes may be employed. Batteries are shown in the accompanying drawings as are also generators as sources of electrical energy. It is obvious that any suitable source of electrical energy may be employed. The commutating potential may comprise any suitable means and of any suitable frequency.

I realize that many modifications of the transmitting system of my invention can be had without departing from the spirit of my invention and it is to be understood that my invention shall not be limited to the foregoing specification or to the accompanying drawings but only by the scope of the appended claims.

What I claim as new and desire to secure by Letters Patent of the United States is as follows:

1. In a transmitting system of the type employing thermionic tubes adapted to amplify a source of high frequency energy the combination of a plurality of thermionic tubes symmetrically arranged in two groups, a source of direct current control electrode biasing potential, a source of alternating energy of lower frequency than said first mentioned source, means for exciting the control electrodes of said thermionic tubes from said last mentioned source said means first conditioning one of said tubes to amplify said high frequency energy to the exclusion of other of said tubes for a given time interval, said means next conditioning said plurality of tubes to jointly amplify said high frequency energy for a succeeding time interval and said means next conditioning another of said tubes to exclusively amplify said energy for the next succeeding time interval in the order named, the directional electrical relationship between the output of each of said groups of tubes and the load remaining unreversed.

2. A transmitting system comprising in combination a source of high frequency electrical energy, a plurality of thermionic tube amplifying means connected with said source, a plurality of individual radiating systems connected to the output circuits of said amplifying means, one of said radiating systems propagating horizontally polarized waves and another of said radiating systems propagating vertically polarized waves, a source of direct current connected with the control electrodes of each of said thermionic tubes and a source of alternating current connected with the control electrodes of each of said thermionic tubes and operative to bias each of said tubes for conditioning each of said tubes to amplify said energy, simultaneously for a predetermined time interval, next conditioning one of said tubes to amplify said energy independently for a given time interval and then conditioning another of said tubes to amplify said energy for a succeeding time interval substantially in the successive order set forth.

3. A transmitting system comprising in combination a source of high frequency electrical energy, a plurality of thermionic tube amplifying means connected with said source, a plurality of individual radiating systems connected with said amplifying means, one of said radiating systems being positioned in a horizontal plane and another of said radiating systems being positioned in a vertical plane in respect to the earth's surface, a source of direct current control electrode biasing potential, and a source of alternating current connected with the control electrodes of said thermionic tubes for conditioning all of said tubes to amplify said energy for a given time interval, some of said tubes to amplify said energy for a succeeding time interval and another of said tubes to amplify said energy for the next succeeding time interval substantially in the successive order above named.

4. A transmitting system comprising in combination a source of high frequency electrical energy, a plurality of thermionic tube amplifying means connected with said source, a plurality of individual radiating systems associated with said amplifying means, said radiating systems comprising directional coil antennas spacially positioned substantially at right angles each to the other, a source of direct current control electrode biasing potential, and a source of alternating current connected with the control electrodes of said thermionic tubes for conditioning all of said tubes to amplify said energy for a given time interval, one of said tubes to amplify said energy for a succeeding time interval and another of said tubes to amplify said energy for the next succeeding time interval substantially in the successive order above named.

5. A transmitting system comprising in combination a source of high frequency electrical energy, a plurality of thermionic tube amplifying means associated with said source, a plurality of individual radiating systems respectively connected with said amplifying means, said radiating systems comprising directional coil antennas spacially positioned substantially at right angles each to the other, individual horizontally positioned and individual vertically positioned antennas, and a source of alternating current connected with the control electrodes of said thermionic tubes for conditioning all of said tubes to amplify said energy for a given time interval, one of said tubes to amplify said energy for a succeeding time interval and another of said tubes to amplify said energy for the next succeeding time interval substantially in the successive order above named.

6. In a transmitting system, a source of high frequency energy, two electron tubes having cathode, control grid and plate electrodes, balanced input and output circuits therefor, a source of direct current grid biasing potential of value not great enough to block said tubes, individual antennas respectively in electrical relation with the output circuits of each of said tubes, a transformer having the terminals of its secondary respectively connected to the control grids of said tubes and having an intermediate tap connected through said source of biasing potential to the cathodes of said tubes, the primary of said transformer being supplied with alternating current of a frequency less than that of said source of high frequency energy and of maximum value sufficient to apply a total biasing voltage sufficient to block one or both of said tubes for a predetermined time interval in succession, whereby one of said tubes alone delivers energy to its corresponding antenna for a given time interval, both of said tubes deliver energy to their corresponding antennas for a succeeding time interval, and the other of said tubes delivers energy to its corresponding antenna for the next succeeding time interval, in succession.

7. In a transmitting system, a source of high frequency energy, a piezo electric crystal element, circuits connecting said piezo electric crystal element to said source and adapted to cause said piezo electric crystal element to maintain constant the frequency of said source, two electron tubes having cathode, control grid and plate electrodes, balanced input and output circuits therefor adapted to cause said tubes to amplify said energy supplied by said source, a source of direct current grid biasing potential of value not great enough to block said tubes, individual antennas respectively in electrical relation with the output circuits of each of said tubes, a transformer having the terminals of its secondary respectively connected to the control grids of said tubes and having an intermediate tap connected through said source of biasing potential to the cathodes of said tubes, the primary of said transformer being supplied with alternating current of a frequency less than that of said source of high frequency energy and of maximum value sufficient to apply a total biasing voltage sufficient to block one of said tubes at a time, whereby one of said tubes alone delivers energy to its corresponding antenna for a given time interval, both tubes deliver energy to their corresponding antennas for a succeeding time interval, and the other tube delivers energy to its corresponding antenna for the next succeeding time interval, in succession.

8. In a transmitting system, a source of high frequency energy, electron tubes having cathode, control grid, shielding grid, and plate electrodes, balanced input and output circuits therefor, a source of direct current grid biasing potential of value not great enough to block said tubes, individual antennas respectively in electrical relation with the output circuits of each of said groups of tubes, a transformer having the terminals of its secondary respectively connected to the control grids of each group of said tubes and having an intermediate tap connected through said source of biasing potential to the cathodes of said tubes, the primary of said transformer being supplied with alternating current of a frequency less than that of said source of high frequency energy and of maximum value sufficient to apply a total biasing voltage sufficient to block one group of said tubes at a time, whereby one group of said tubes alone delivers energy to its corresponding antenna for a predetermined time interval, both groups of tubes deliver energy to their corresponding antennas for a succeeding time interval, and the other group of tubes delivers energy to its corresponding antenna for the next succeeding time interval, in succession.

9. In a transmitting system, a source of high frequency energy, two symmetrical groups of electron tubes having cathode, control grid and plate electrodes, balanced input and output circuits therefor, a source of direct current grid biasing potential of value not great enough to block said tubes, individual antennas respectively connected in electrical relation with the output circuits of each of said groups of tubes, said antennas having markedly different radiation characteristics, a transformer having the terminals of its secondary respectively connected to the control grids of each group of said tubes and having an intermediate tap connected through said source of biasing potential to the cathodes of said tubes, the primary of said transformer being supplied with alternating current of a frequency less than that of said source of high frequency energy and of maximum value sufficient to apply a total biasing voltage sufficient to block one group of said tubes at a time, whereby one group of said tubes alone delivers energy to its corresponding antenna for a predetermined time interval, both groups of tubes deliver energy to their corresponding antennas for the succeeding time interval, and the other group of tubes delivers energy to its corresponding antenna for the next succeeding time interval, in succession.

10. In a transmitting system, a source of high frequency energy, two symmetrical groups of electron tubes having cathode, control grid, and plate electrodes, balanced input and output circuits therefor, a source of direct current grid biasing potential of value not great enough to alone block said tubes, individual antennas respectively connected in electrical relationship with the output circuits of each group of said tubes, said antennas having markedly different radiation characteristics, a transformer having the terminals of its secondary respectively connected to the control grids of each group of said tubes and having an intermediate tap connected through said source of biasing potential to the cathodes of said tubes, the primary of said transformer being supplied with alternating current of a frequency less than that of said source of high frequency energy and of maximum value great enough to increase the total biasing voltages over short periods to a value sufficient to block one tube at a time, whereby one group of said tubes alone delivers energy to its corresponding antenna for a predetermined time interval, next both groups of said tubes deliver energy to said antennas for the succeeding time interval, and the other group of tubes alone delivers energy to its corresponding antenna for the next succeeding time interval, in succession.

11. In a transmitting system, a source of frequency energy, two symmetrical groups of electron tubes having cathode, control grid and plate electrodes, balanced input and output circuits therefor, a source of direct current grid biasing potential of value not great enough to block said tubes, individual antennas respectively in electrical relation with the output circuits of each of said groups of tubes, a transformer having the terminals of its secondary respectively connected to the control grids of each group of said tubes and having an intermediate tap connected through said source of biasing potential to the cathodes of said tubes, the primary of said transformer being supplied with alternating current of a frequency less than that of said source of high frequency energy and of maximum value sufficient to apply a total biasing voltage sufficient to block one group of said tubes at a time, the directional electrical relationship between the output of each of said groups of tubes and the radiation of its corresponding antenna remaining unreversed, whereby one group of said tubes alone delivers energy to its corresponding antenna for a predetermined time interval, both groups of tubes deliver energy to their corresponding antennas for a succeeding time interval, and the other group of tubes delivers energy to its corresponding antenna for the next succeeding time interval, in succession.

12. A transmitting system comprising a high frequency oscillator, a pair of branch circuits, a power amplifier connected in each of said branch circuits and having the input thereof supplied with energy from said oscillator, a radiating system of differing transmission characteristics connected with the output of each of said power amplifiers, a direct current source connected with the control circuits of said power amplifiers for preconditioning the operation thereof, an alternating current supply source superimposed upon the control circuits of said power amplifiers for automatically effecting the transfer of energy from said oscillator exclusively to one of said radiating systems of a particular transmission characteristic for a predetermined time interval, next effecting the transfer of energy simultaneously to both of said radiating systems for the next succeeding time interval, and next effecting the transfer of energy exclusively from the other of said radiating systems of different transmission characteristic for the next succeeding time interval.

JOHN A. WILLOUGHBY.